(12) United States Patent
Pinheiro

(10) Patent No.: US 7,835,521 B1
(45) Date of Patent: Nov. 16, 2010

(54) SECURE KEYBOARD

(75) Inventor: Eduardo S. Pinheiro, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1350 days.

(21) Appl. No.: 11/294,299

(22) Filed: Dec. 2, 2005

(51) Int. Cl.
*H04N 7/167* (2006.01)
*G06F 3/00* (2006.01)

(52) U.S. Cl. .......................... 380/239; 710/12
(58) Field of Classification Search .............. 380/239; 710/12
See application file for complete search history.

(56) References Cited

U.S. PATENT DOCUMENTS

| | | | | |
|---|---|---|---|---|
| 5,809,143 | A * | 9/1998 | Hughes | 705/77 |
| 6,134,661 | A * | 10/2000 | Topp | 726/18 |
| 7,370,166 | B1 * | 5/2008 | Ramesh et al. | 711/163 |
| 2002/0080967 | A1 * | 6/2002 | Abdo et al. | 380/270 |
| 2002/0169959 | A1 * | 11/2002 | Hsu | 713/169 |
| 2003/0159053 | A1 * | 8/2003 | Fauble et al. | 713/189 |
| 2004/0230805 | A1 * | 11/2004 | Peinado et al. | 713/181 |
| 2005/0066186 | A1 * | 3/2005 | Gentle et al. | 713/193 |
| 2005/0177649 | A1 * | 8/2005 | Chung Geon et al. | 710/1 |
| 2008/0313370 | A1 * | 12/2008 | Kang et al. | 710/67 |

OTHER PUBLICATIONS

Treat, Daniel G., "Keyboard Encryption", *IEEE Potentials*, Aug. 2002, pp. 40-42.

* cited by examiner

*Primary Examiner*—Techane J Gergiso
(74) *Attorney, Agent, or Firm*—Sterne, Kessler, Goldstein & Fox PLLC

(57) ABSTRACT

A secure keyboard combines a human interface device (HID), application programs stored in nonvolatile memory, and encryption technologies into a single package. Like any other keyboard, the secure keyboard communicates with a computer via a communications port. A computer can load and execute an application stored in the secure keyboard. The application, however, expects encrypted inputs. The HID inputs are encrypted before being passed to the computer and thence the application. Therefore, a secure link exists from the HID to the application. Choosing strong encryption and unique encryption/decryption keys allows applications to be keyed to a specific secure keyboard. No other keyboard can supply keyboard input to the application. The secure keyboard can be implemented as a security device that does not include a keyboard. The security device can accept HID inputs from HID devices, encrypts them, and passes them to the computer and thence the application.

16 Claims, 7 Drawing Sheets

SECURE KEYBOARD

TECHNICAL FIELD

Embodiments relate to the fields of computer peripherals, nonvolatile memory, and computer applications. Embodiments also relate to the fields of encryption, decryption, and communications.

BACKGROUND

As computing evolves from the early data processing center paradigm to the ubiquitous computing paradigm the portability and security of applications and data comes to the fore. Flash memory devices, such as key drives, allow users to easily carry data and applications. The key drive is simply inserted into a computer at which time an application running on the key drive is launched. The user then interacts with the application. The user's interactions often involve reading and storing data that is also stored in the key drive. As such, the data and applications stored on the key drive are central to the user's needs while the computer that is used becomes unimportant.

A computer is a device characterized by a processor, memory, and input/output (I/O) devices. A user can interact with a computer using a human interface device (HID) such as a keyboard or a mouse. The computer can present information to the user using a display device. The computer runs programs, or applications, for the benefit of the user. Users use word processing applications to create documents, drawing applications to create pictures, and gaming applications to have fun. The application itself is usually stored on a nonvolatile memory device, such as a hard drive or flash drive, from which the computer can load it and then execute it. The user sends input to the application via the HID and observes the results via the display. The HID uses a communication port to send user input to the computer which receives it using another communications port. The computer passes then user input to the application.

Computer memory can be categorized as volatile or nonvolatile. A volatile memory is one that loses its contents when it loses power. A nonvolatile memory is one that retains its contents for a meaningful period of time after it loses power. Floppy disks, magnetic tape, compact disks, digital video disks, computer hard drives, and flash memory are types of nonvolatile memories. Flash memories are used in pen drives, memory cards, and memory sticks. Many nonvolatile memories are packed with a write protect switch. The write protect switch has an engaged position and a disengaged position. Placing the write protect switch in the disengaged position prevents data from being written into the nonvolatile memory. As such, flipping a switch causes a nonvolatile memory to become a read-only nonvolatile memory.

In all computing environments, the security of the user's data is important. Different security technologies are available. In current technology, the level of security offered by secret key technologies, such as the data encryption standard (DES) or offspring triple DES (DES), is largely replaced by public key technologies. Public key technologies use a key pair with one key often called a public key and the other called a private key. The keys in a key pair can also be called, and used as, an encryption key and a decryption key. In typical operation, data encrypted with one key is decrypted with the other and vice versa. Key pairs are usually unique meaning that each public key has only one corresponding private key. Furthermore, a person with one of the keys can encrypt data but can not decrypt it because it is difficult to find the corresponding key in the key pair.

FIG. 8, labeled as "prior art", illustrates an encryption module 801 that has an encryption key 802. An encryption module 801 can encrypt data. Some encryption modules selectively encrypt data, meaning that they identify certain types of data to encrypt or other types of data to leave unencrypted.

With public key technology, a person with one of the keys rarely has the corresponding key in the key pair. The difficulty of determining the corresponding key, thereby compromising the key pair, depends on the key length. The longer the keys are, the harder it is to compromise the key pair. Those skilled in the arts of data encryption, cryptography, or decryption are aware of many aspects and implementations of public key encryption.

One way to decrypt data that has been encrypted is called a brute force attack. An attacker has one key and can use it to encrypt some data. A brute force attack uses all the possible decryption keys until one of them successfully decrypts the data.

Another attack is called a dictionary attack. The attacker encrypts many, and sometimes all, of the possible pieces of data to produce a dictionary. When given encrypted data the attacker simply finds the encrypted message in the dictionary and thereby finds the decrypted data. Dictionary attacks are most effective when there are a limited number of possible pieces of data. For example, dictionary attacks have worked well against passwords because most passwords fall into a few categories such as names and nouns.

A third type of attack is called a statistical attack in which the attacker gathers many different pieces of encrypted data. The most common piece of encrypted data probably corresponds to the most commonly used piece of data. For example, consider a series of messages, each containing many pieces of encrypted data. If the second piece of data is always the name of the author, then the most commonly occurring second piece of data corresponds to the name of the most prolific author. This fact can be used to attack the rest of the data.

One defense against dictionary attacks or statistical attacks is to use a random salt. A random salt is a random number or character sequence that is prepended or appended to a datum. For example, a communication with ten possible datums, or values, can be attacked using a dictionary with ten entries. A random salt having one million possible permutations can be appended to the datum. Now the dictionary must have ten million entries. The random salt can be obtained from a random number generator. Those skilled in the art of computer programming and computer architecture are familiar with hardware based and software based random number generators. Those skilled in the art of encryption are familiar with random salts.

Another attack that has been successfully used to obtain a user's data is called key logging. The attacker intercepts every HID input and keeps track of it. On subsequent examination, the attacker can often discover valuable information. The spyware epidemic currently infecting the internet includes key loggers. People go through great efforts to clean their computers by removing malicious programs, such as spyware.

Yet another attack for obtaining a user's data is replacing a trusted application module with a compromised or forged application module. A compromised application module is an application module, such as a web browser, that the attacker has altered. The alterations can be designed to steal data and send it to the attacker. The alterations can also be designed to attack other computers on a network. A forged application module is an application module that appears to be genuine, but is not. For example, a user buys a word processor that comes packaged on a compact disk (CD). The attacker, however, has managed to replace the word processor with another program that appears the same, but also steals data. The user installs the forged application module and becomes a victim.

Compromised and forged applications are often detected through the use of checksums or secure hash functions. Checksums and hash functions are algorithms that read in data and produce a number called a signature. For example, a hash function can read an application module, treating it as data, and produce the signature 5,551,212. If, at a later time, the signature is calculated as 666, then the user knows that the application module has changed. Software distributors often distribute signatures along with their programs so that forging can also be detected. The current state of the art is the secure hash algorithm (SHA) family of hash functions that are replacing the previously popular MD5 hash function. Those practiced in the art computer security are familiar with checksums, secure hash functions, and digital signatures for application modules.

People carrying applications and data in personal and portable nonvolatile storage devices, however, must either use clean computers or risk data theft. The reason is that a public computer or a friend's computer can have spyware. Current technology is limited in that it does not provide for portable applications and data, such as those stored on a key drive, to be safely used on an insecure computer. Current technology is also limited in that it does not allow user inputs, such as those entered using a keyboard or mouse, to be entered into an insecure computer.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to provide a system that has a human interface device (HID), one or more communications ports, a memory port, and an encryption module. A keyboard is an example of an HID that a user can use to supply inputs to a computer. The memory port holds a nonvolatile memory such as a flash disk or hard drive. Some memory ports allow the nonvolatile memory to be plugged in and later unplugged, such as a universal serial bus (USB) port that can be used with USB key drives. Other memory ports permanently hold the nonvolatile memory. For example, a circuit board to which a nonvolatile memory is soldered can be considered to be a memory port. The encryption module can include an encryption key that is used for encrypting data before the data is passed to the computer by way of a communications port. As such, a user's HID input can be encrypted, passed to a communications port, and then sent to the computer. Furthermore, it is possible for some HID inputs to be encrypted while others are not. For example, alphanumeric key presses can be encrypted while special function keys are not.

It is another aspect of the embodiments that the nonvolatile memory holds at least one application. An application is a computer program. After the communications port is connected to a computer, the application can be loaded from the nonvolatile memory onto the computer and then executed. The same communications port can be used for loading the application and for sending encrypted HID inputs. Alternatively, different communications ports can be used for application loading and for sending encrypted HID inputs.

It is yet another aspect of the embodiments that an application held in the nonvolatile memory has a decryption module. When the encryption module includes an encryption key, then the decryption module includes a decryption key. The decryption module decrypts data, such as HID inputs, that the encryption module encrypted.

It is an aspect of certain embodiments that an encryption key and a decryption key will be used as a unique pair. The unique pair ensures that only those applications with the proper decryption key can use HID inputs that have been encrypted by the encryption module. One effect of this is to secure communications between the HID and the application because an attacker must have the correct decryption key. Another effect is that an application can be locked to one particular encryption module. This means that the hardware device that includes the encryption module must be present in order for the application to function.

It is an aspect of some embodiments to use a random salt. As discussed above, dictionary attacks can be used against encrypted data. If each datum is a key press, then dictionary attacks can easily succeed because there are few keys and key press combinations. However, as also discussed above, a random salt can thwart dictionary attacks.

It is an aspect of various embodiments that applications can be downloaded from the computer into the nonvolatile memory. When decryption keys are used, the decryption key must be set within the application's decryption module. Only those who know the decryption key can do so. Among those who might know the decryption key are the user, the manufacturer of the encryption module, or a key authority who is trusted to handle keys.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

A secure keyboard or security device can protect the communications between a human interface device (HID) and a computer application. The protection is even available when the computer being used is infected with spyware. Security is obtained by encrypting HID inputs before they reach the computer. The computer then passes the encrypted HID inputs to the application. An infected computer can even log the encrypted HID inputs, thereby creating a useless log of unintelligible data. The application then decrypts the inputs and uses them normally. The highest levels of security are available when an advanced cryptographic standard, such as the advanced encryption standard (AES) is used because a unique key pair can be generated for every secure keyboard and every security device.

Architectural Overview

Figure 1:
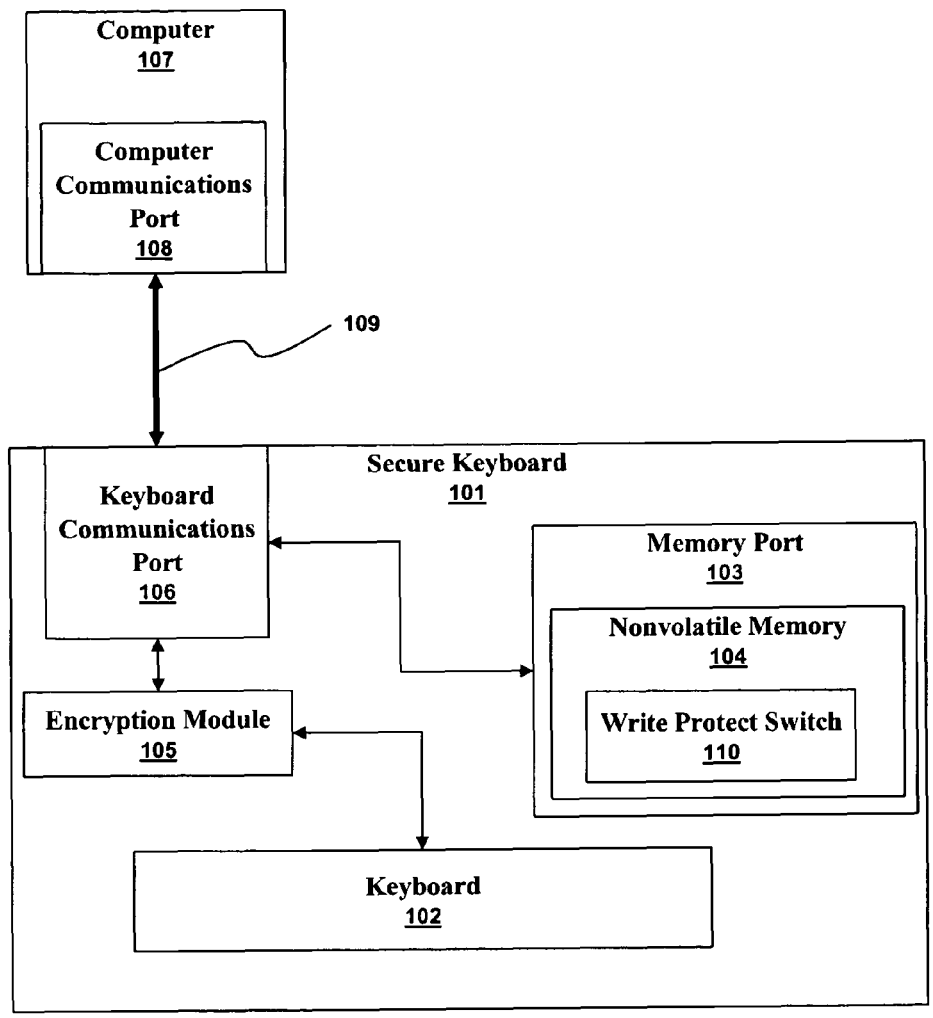
FIG. 1 illustrates a computer and a secure keyboard in accordance with aspects of the embodiments.

FIG. 1 illustrates a computer 107 and a secure keyboard 101 in accordance with aspects of the embodiments. A secure keyboard 101 contains a keyboard 102, memory port 103, keyboard communications port 106 and encryption module 105. The memory port 103 contains a nonvolatile memory 104 and the nonvolatile memory 104 contains a write protect switch 110. Alternatively, the write protect switch 110 can be part of the memory port 103 and not part of the nonvolatile memory 104. The secure keyboard 101 can be connected to a computer 107 by forming a connection 109 between the keyboard communications port 106 and the computer communications port 108. After forming the connection, an application program (not shown) stored in the nonvolatile memory 104 can be loaded into the computer 107 and executed. A user can press a key on the keyboard 102 to produce an HID input. The HID input is encrypted by the encryption module 105, passed to the keyboard communications port 106, and then communicated to the computer 107. Note that the encryption module 105 can use an encryption key. The encryption key can be one member of a key pair. The encryption key can be a secret key, such as used by the data encryption standard (DES) or triple DES (3DES).

Figure 2:
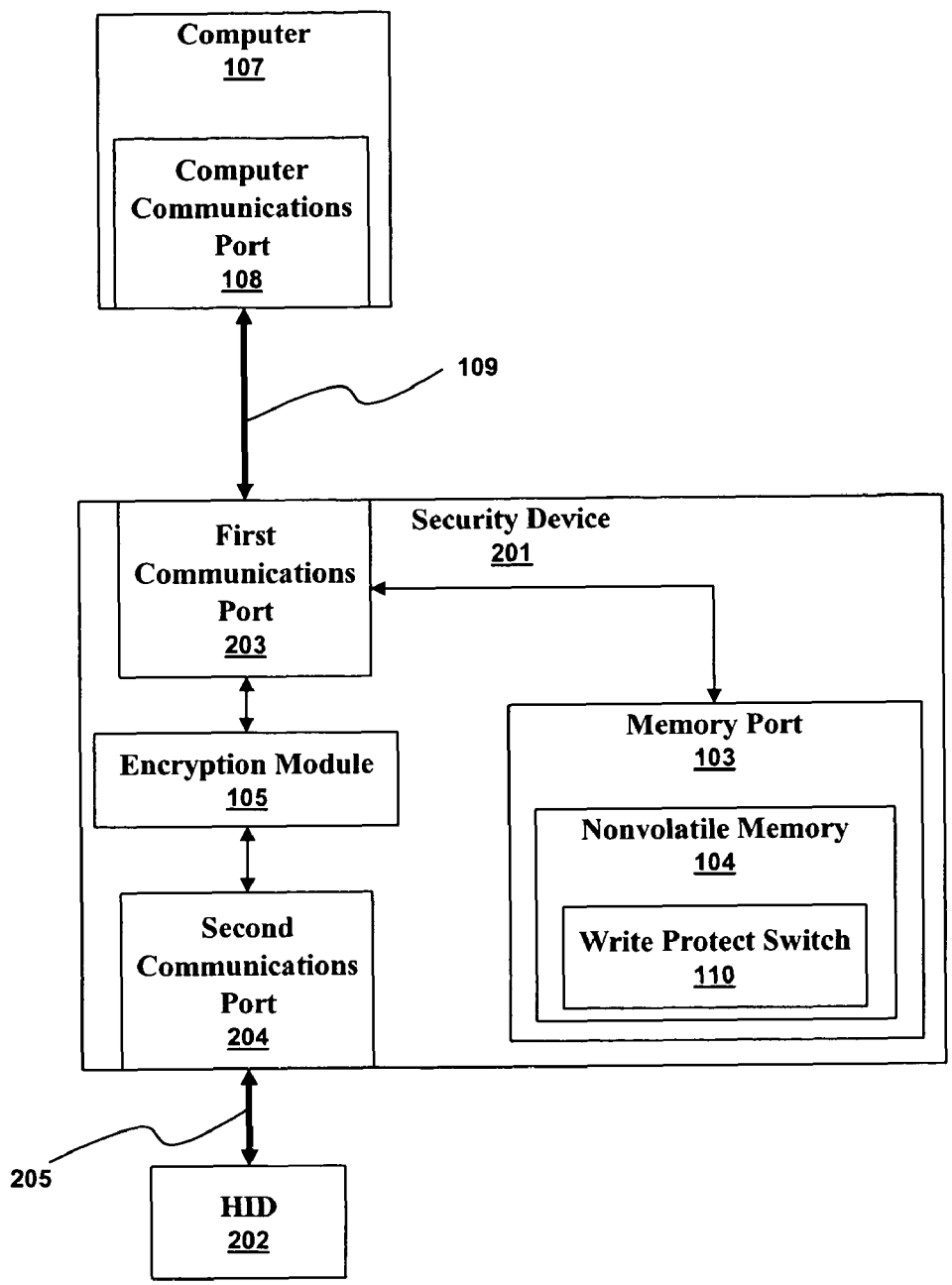
FIG. 2 illustrates a computer, an HID, and a security device in accordance with aspects of the embodiments.

FIG. 2 illustrates a computer 107, an HID 202, and a security device 201 in accordance with aspects of the embodiments. Here, the security device 201 contains a memory port 103, first communications port 203, second communications port 204, and encryption module 105. The memory port 103 contains a nonvolatile memory 104 and the nonvolatile memory 104 contains a write protect switch 110. Alternatively, the write protect switch 110 can be part of the memory port 103 and not part of the nonvolatile memory 104. The security device 101 can be connected to a computer 107 by forming a connection 109 between the first communications port 203 and the computer communications port 108. After forming the connection, an application program (not shown) stored in the nonvolatile memory 104 can be loaded into the computer 107 and executed. An HID 202 is connected to the security device 201 by forming a second connection 205 between the HID 202 and second communications port 204. A user can produce an HID input which is passed to the second communications port 204 and then to the encryption module 105. The HID input is encrypted by the encryption module 105, passed to the first communications port 203, and then communicated to the computer 107.

Figure 3:
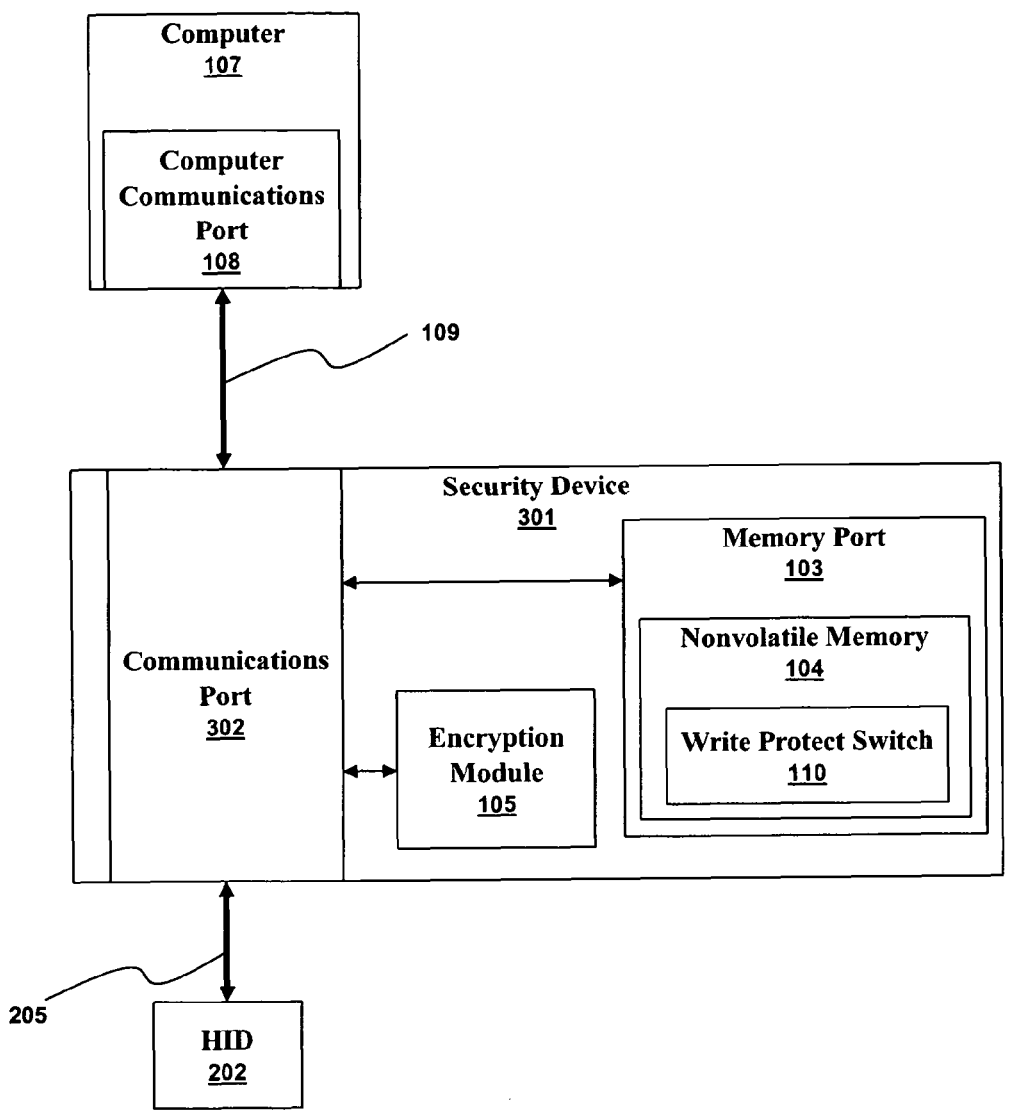
FIG. 3 illustrates a computer, an HID, and a security device using a single communications port in accordance with aspects of the embodiments.

FIG. 3 illustrates a computer 107, an HID 202, and a security device 301 using a single communications port in accordance with aspects of the embodiments. The security device 301 of FIG. 3 differs from that of FIG. 2 in using a single communications port 302 instead of two. In general, a single communications port can act like any number of communication ports. For example, an Ethernet port, as is common on most computers, is a single hardware port that can appear to other computers and to applications programs as tens of thousands of individual ports. Similarly, a single Bluetooth port can simultaneously interface with many other Bluetooth ports on different devices. The purpose of FIG. 3 is to show that a single communications port 302 can handle all the requirements of a security device. Alternatively, a different security device could require three communications ports: two as shown in FIG. 2 plus another one that links the memory port to the computer 107.

Figure 4:
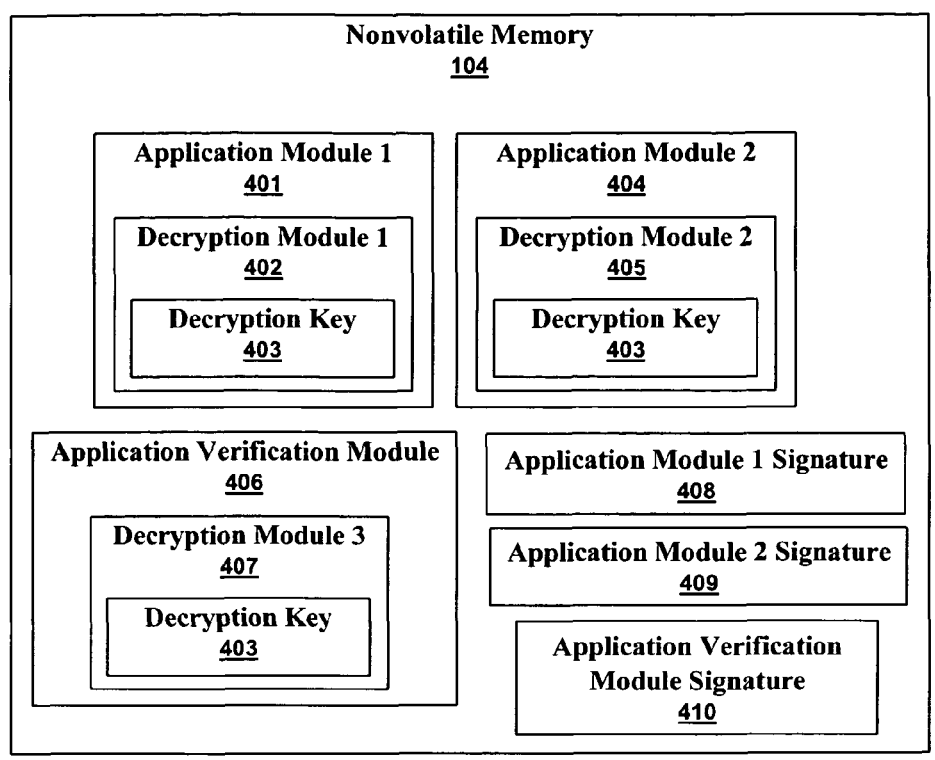
FIG. 4 illustrates a nonvolatile memory in accordance with aspects of the embodiments.

FIG. 4 illustrates a nonvolatile memory 104 in accordance with aspects of the embodiments. Here, the nonvolatile memory 104 is shown containing application modules. The first application module 401, perhaps a spreadsheet, contains decryption module 1 402, which in turn contains a decryption key 403. The second application module 404, perhaps an email client, contains decryption module 2 405, which also contains the decryption key 403. The same decryption key 403 is used by both modules because the decryption key must match the encryption key which is part of the encryption module. An application verification module 406 is also shown containing a decryption module 407 that in turn contains decryption key 403. In embodiments where the application verification module 406 does not need HID input, the decryption module 407 is not needed. The application verification module 406 can use the application module 1 signature 408 to verify that application module 1 401 is not compromised or forged. The application verification module 406 can use the application module 2 signature 409 to verify that application module 2 404 is not compromised or forged. The application verification module 406 can use the application verification module signature 410 to verify itself as neither compromised nor forged.

High Level Process Flow

Figure 5:
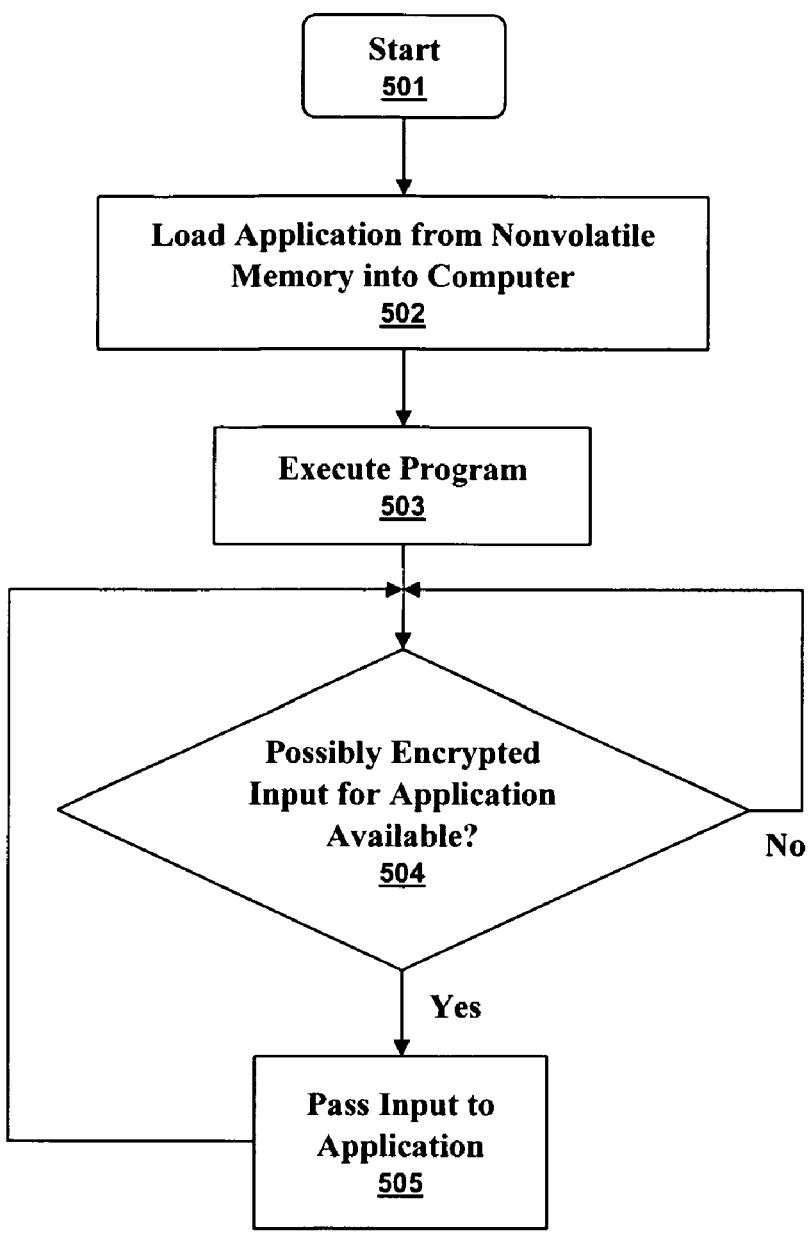
FIG. 5 illustrates a high level block diagram of a computer loading an application and processing input in accordance with aspects of the embodiments.

FIG. 5 illustrates a high level block diagram of a computer loading an application and processing input in accordance with aspects of the embodiments. After the start 501, the application stored in the nonvolatile memory is loaded into the computer 502 and executed 503. The computer then waits for user input, which could be encrypted. When the computer receives user input, it can direct that input at an application, possibly the one obtained from the nonvolatile memory. As such, if input for the application is available 504 the computer passes it to the application 505. In either case, the process loops back to waiting for more input.

Figure 6:
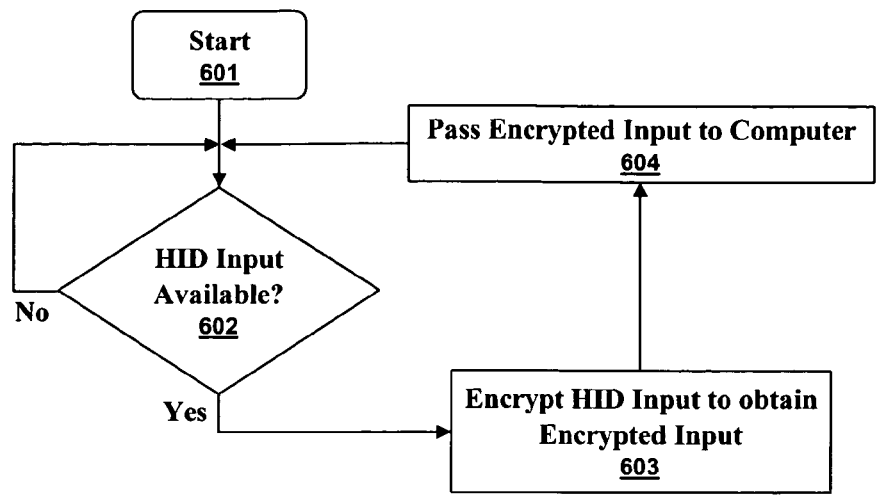
FIG. 6 illustrates a high level block diagram of a security device or secure keyboard processing user inputs in accordance with aspects of the embodiments.

FIG. 6 illustrates a high level block diagram of a security device or secure keyboard processing user inputs in accordance with aspects of the embodiments. After the start 601, the secure keyboard waits for HID input, such as a key press. If there is HID input available 602, the HID input is encrypted 603, and then passed to the computer 604. In all cases, the keyboard process loops back to waiting for more input.

Figure 7:
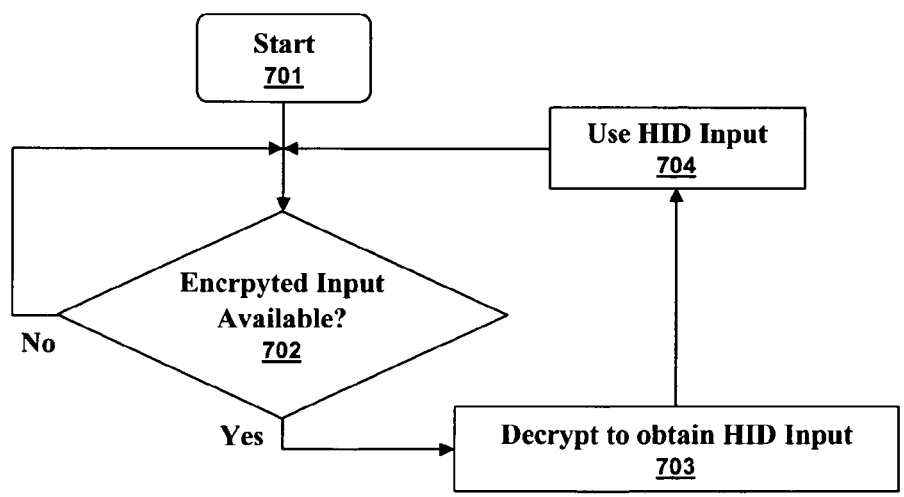
FIG. 7 illustrates a high level block diagram of an application processing encrypted inputs in accordance with aspects of the embodiments.
Figure 8:
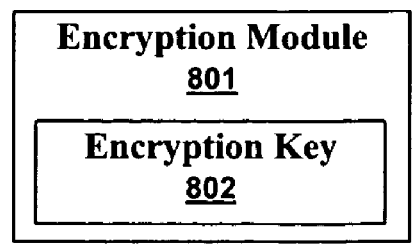
FIG. 8, labeled as "prior art", illustrates an encryption module with an encryption key.

FIG. 7 illustrates a high level block diagram of an application processing encrypted inputs in accordance with aspects of the embodiments. After the start 701, the application waits for input. If there is encrypted input available 702, then it is decrypted 703 and used 704. In all cases, the application returns to waiting for more input.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment" or "certain embodiment" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
   a keyboard;
   at least one communications port and a memory port wherein at least one of the at least one communications port communicates with a computer;
   a nonvolatile memory electrically connected to the memory port wherein the nonvolatile memory stores at least one application module and wherein the keyboard is configured to upload the at least one application module from the nonvolatile memory to the computer to be executed on the computer;
   an encryption module comprising an encryption key wherein the encryption module uses the encryption key to encrypt a keyboard input to produce an encrypted input;
   at least one decryption module comprising a decryption key wherein each one of the at least one application module comprises at least one of the at least one decryption module, wherein the encrypted input is received by the computer and passed to one of the at least one application module, and wherein the at least one application module uses the at least one decryption module to decode the encrypted input;
   a new application module comprising the decryption key, wherein the keyboard stores the new application module in the nonvolatile memory; and
   an application verification module that ensures that the new application module and the at least one application module are not compromised or forged, wherein the application verification module uses a corresponding application module signature for each application module.

2. The system of claim 1 wherein the encryption key and the decryption key form a unique pair such that the encrypted input produced by the encryption module can be used by the at least one application module.

3. The system of claim 2 further comprising a random salt such that the encryption module produces the encrypted input using the random salt and the keyboard input.

4. The system of claim 1 further comprising a write protect switch contained in the nonvolatile memory having a disengaged state wherein data can not be stored into the nonvolatile memory unless the write protect switch is in the disengaged state.

5. The system of claim 1 further comprising a random salt such that the encryption module produces the encrypted input using the random salt and the keyboard input.

6. A system comprising:
   at least one communications port and a memory port wherein at least one of the at least one communications port communicates with a human interface device and wherein at least one of the at least one communications port communicates with a computer;
   a nonvolatile memory electrically connected to the memory port wherein the nonvolatile memory stores at least one application module and wherein the nonvolatile memory is configured to upload at least one of the at least one application module to the computer to be executed on the computer;
   an encryption module comprising an encryption key wherein the human interface device receives an input and passes the input to the encryption module and wherein the encryption module produces an encrypted input from the input and the encryption key;
   at least one decryption module comprising a decryption key wherein each one of the at least one application module comprises at least one of the at least one decryption module, wherein the encrypted input is received by the computer and passed to one of the at least one application module, and wherein the at least one application module uses the at least one decryption module to decode the encrypted input;
   a new application module comprising the decryption key, wherein the human interface device stores the new application module in the nonvolatile memory; and
   an application verification module that ensures that the new application module and the at least one application module are not compromised or forged, wherein the application verification module uses a corresponding application module signature for each application module.

7. The system of claim 6 wherein the encryption key and the decryption key form a unique pair such that the encrypted input produced by the encryption module can be used by the at least one application module.

8. The system of claim 7 further comprising a random salt such that the encryption module produces the encrypted input using the random salt and the human interface device input.

9. The system of claim 6 further comprising a write protect switch contained in the nonvolatile memory having a disengaged state wherein data can not be stored into the nonvolatile memory unless the write protect switch is in the disengaged state.

10. The system of claim 6 further comprising a random salt such that the encryption module produces the encrypted input using the random salt and the human interface device input.

11. A method comprising:
providing a secure keyboard comprising a keyboard, a memory port, a communications port and an encryption module;
electrically connecting a nonvolatile memory to the memory port and connecting the communications port to a computer wherein the nonvolatile memory stores an application comprising a decryption module;
uploading and then executing the application comprising the decryption module;
obtaining a keyboard input from the keyboard, encrypting the keyboard input to produce an encrypted input and passing the encrypted input to the computer wherein the computer then passes the encrypted input to the application;
storing a new application module comprising the decryption key in the nonvolatile memory;
ensuring that the new application module and the at least one application module are not compromised or forged; and
decrypting the encrypted input using the uploaded decryption module, wherein an application verification module uses a corresponding application module signature for each application module.

12. The method of claim 11 wherein the encryption module comprises an encryption key, wherein the decryption module comprises a decryption key, and the encryption key and the decryption key form a unique pair such that a second application comprising a second decryption module comprising a second decryption key can not decrypt the encrypted input.

13. The method of claim 12 further comprising a random salt such that the encryption module produces the encrypted input using the random salt and the keyboard input.

14. The method of claim 11 further comprising a random salt such that the encryption module produces the encrypted input using the random salt and the keyboard input.

15. A system comprising:
means for storing an application in conjunction with a keyboard such that the application is loaded into and run on a computer communicating with the keyboard;
means for encrypting a keyboard input such that the computer receives an encrypted input from the keyboard and passes the encrypted input to the application;
means for the application to decrypt the encrypted input that is uploaded to the computer with the application;
means for storing a new application module in a nonvolatile memory of the keyboard, wherein the new application module comprises the means for the application to decrypt the encrypted input; and
means for ensuring that the application and the new application are not compromised or forged, wherein the means for ensuring comprises an application verification module that uses a corresponding application module signature for each application module.

16. A method comprising:
uploading a decryption module to a computer from a human interface device upon electrical connection to the computer;
obtaining an input at the human interface device;
encrypting the input to produce an encrypted input and passing the encrypted input to the computer;
storing a new application module comprising the decryption module in the human interface device;
ensuring that the new application module and the decryption module are not compromised or forged; and
decrypting the encrypted input using the uploaded decryption module, wherein an application verification module uses a corresponding application module signature for each application module.

* * * * *